United States Patent [19]
Werner et al.

[11] Patent Number: 5,190,607
[45] Date of Patent: Mar. 2, 1993

[54] MOISTURE-CURING, NCO-REACTIVE POLYURETHANE HOTMELT ADHESIVE COMPOSITION

[75] Inventors: Joachim Werner, Dormagen; Walter Meckel, Neuss; Horst Stepanski, Leverkusen; José Colinas-Martinez, Wermelskirchen, all of Fed. Rep. of Germany

[73] Assignee: Bayer Aktiengesellschaft, Leverkusen Bayerwerk, Fed. Rep. of Germany

[21] Appl. No.: 927,444

[22] Filed: Aug. 10, 1992

Related U.S. Application Data

[62] Division of Ser. No. 872,275, Apr. 22, 1992.

[30] Foreign Application Priority Data

May 1, 1991 [DE] Fed. Rep. of Germany ....... 4114220

[51] Int. Cl.$^5$ ...................... C08G 18/70; C08G 77/04; C08J 4/00
[52] U.S. Cl. ................. 156/331.1; 156/331.7; 525/453; 528/67
[58] Field of Search .......... 156/331.1, 331.7; 525/453; 528/67

[56] References Cited

U.S. PATENT DOCUMENTS

| | | | |
|---|---|---|---|
| 4,585,819 | 4/1986 | Reischle et al. | 524/196 |
| 4,623,709 | 11/1986 | Bauriedel | 528/65 |
| 4,775,719 | 10/1988 | Markevka et al. | 525/125 |
| 4,891,269 | 1/1990 | Markevka et al. | 428/423 |
| 5,019,635 | 5/1991 | Blevins et al. | 526/266 |
| 5,039,573 | 8/1991 | Bravet et al. | 528/67 |
| 5,070,114 | 12/1991 | Watts et al. | 528/67 |
| 5,115,073 | 5/1992 | Meckel et al. | 528/83 |

FOREIGN PATENT DOCUMENTS

| | | |
|---|---|---|
| 246473 | 11/1987 | European Pat. Off. |
| 248658 | 12/1987 | European Pat. Off. |
| 3449124 | 4/1989 | European Pat. Off. |

Primary Examiner—Morton Foelak
Attorney, Agent, or Firm—Joseph C. Gil; Godfried R. Akorli

[57] ABSTRACT

The invention relates to a moisture-curing, NCO-reactive polyurethane hotmelt adhesive composition to a process for its production and to its use as an adhesive wherein the hot-melt adhesive characterized by a reaction product obtainable by reaction of:

A) a mixture of:
  i) polyfunctional polyol component which is liquid or highly viscous (paste-like) at room temperature (25° C.) and which has an average molecular weight of 500 to 5,000 and which is consisting of at least one polyether and/or polyester polycol, and
  ii) a polyfunctional polyol component which is crystalline at room temperature (25° C.) and which has a molecular weight of 500 to 10,000 and preferably 2,000 to 5,000 with a mixture of
B)
  i) a polyisocyanate component containing two differently reactive NCO groups and
  ii) a diisocyanate component having an NCO reactivity to hydroxyl groups which is greater which is greater than that of the less reactive NCO groups of the polyisocyanate component containing two differently reactive NCO groups.

the overall ratio of NCO:OH groups being greater than 1, and the ratio of the NCO groups of the polyisocyanate component containing two differently reactive NCO groups to the OH groups of the polyol component i) being between 1.05 and 2.0 and the ratio by weight formed from the quantity of polyol component to the quantity of the polyisocyanate component containing two differenty reactive NCO groups and the quantity of the crystalline polyol component, the diisocyanate component containing isocyanate groups which are more reactive to OH groups than the less reactive NCO groups of the isocyanate containing two differently reactive NCO groups being between 10 and 0.1.

6 Claims, No Drawings

MOISTURE-CURING, NCO-REACTIVE POLYURETHANE HOTMELT ADHESIVE COMPOSITION

This application is a division, of application Ser. No. 07/872,275 filed Apr. 22, 1992.

BACKGROUND OF THE INVENTION

This invention relates to a moisture-curing NCO-reactive polyurethane hotmelt adhesive composition, to a process for its production and to its use as an adhesive.

Moisture-curing one-component NCO-reactive polyurethane hotmelt adhesives (also known as hotmelts) are known as a basis for adhesives and sealing compounds. After application to a substrate, they develop their ultimate strength and heat resistance by an after-reaction of the free NCO groups with water from the atmosphere.

Many applications require rapid setting of the applied reactive hotmelts to allow further processing in short cycle times. In addition, it is important in these applications that there is very little, if any, change in volume during setting and final curing so that no mechanical stresses are built up. Neither should any mechanical stresses be built up by variations in temperature. In addition, the hotmelts used for bonding must show high heat resistance and, in the event of prolonged storage in water, should not allow any of the water to creep through.

An improved, i.e. shorter, setting time can be obtained by addition of resins or thermoplastic polymers (EPA 0 232 055, EPA 0 107 097, EPA 0 246 473). However, the large percentages of thermoplastic resins still present after crosslinking adversely affect shear strength at elevated temperature.

The use of polyesters having a large content of aromatic dicarboxylic acid (EP-A 0 248 658) also improves the setting rate, but leads to products of high melt viscosity (which complicates processing) and, in the cured state, to poor flexibility for many applications. The same also applies where rapidly crystallizing aliphatic polyesters are used (DE-A 3 827 224). The marked tendency towards crystallization leads to a measurable change in volume during curing which, in adhesive bonds, causes the layer of adhesive to separate from the substrate. Where the adhesive bonds are stored in water, this in turn leads to the distinct creepage of water beneath the adhesive layer.

The marked tendency towards crystallization where readily crystallizing aliphatic polyesters are used also presupposes that the adhesives used are applied to preheated substrate. If the adhesives used are applied to non-preheated substrate, "skin formation" occurs through spontaneous crystallization at the surface, distinctly reducing adhesion and promoting the above-mentioned separation from the substrate. An adhesive which could be applied to non-preheated substrate would clearly simplify the application process.

Where hotmelts are used in the automotive industry for bonding windows or headlamp lenses, i.e. glass/plastic composites, rapid curing (short cycle times), minimal shrinkage during curing and resistance to the creepage of water are particularly necessary. The imperviousness of the adhesive bond to moisture has to satisfy stringent requirements.

Accordingly, the problem addressed by the present invention was to develop moisture-crosslinking hotmelt adhesives which would cure flexibly with no stresses after a short setting time, could be applied with advantage to non-preheated substrates and, after curing, would give adhesive bonds highly resistant to the creepage of moisture.

It has now been found that, according to the invention, this problem can be solved by a novel moisture-curing, NCO-reactive polyurethane hotmelt adhesive composition

SUMMARY OF THE INVENTION

In accordance with the foregoing, the present invention encompasses a moisture-curing NCO-reactive polyurethane hot melt adhesive composition comprising a reaction product obtainable by reaction of
A) a mixture of:
  i) polyfunctional polyol component which is liquid or highly viscous (paste-like) at room temperature (25° C.) and which has an average molecular weight of 500 to 5,000 and which is consisting of at least one polyether and/or polyester polyol, and
  ii) a polyfunctional polyol component which is crystalline at room temperature (25° C.) and which has a molecular weight of 500 to 10,000 and preferably 2,000 to 5,000 with a mixture of
B)
  i) a polyisocyanate component containing two differently reactive NCO groups and
  ii) a diisocyanate component having an NCO reactivity to hydroxyl groups which is greater than that of the less reactive NCO groups of the polyisocyanate component containing two differently reactive NCO groups, the overall ratio of NCO:OH groups being greater than 1, preferably between 2 and 1 and, more preferably, between 1.8 and 1.2 and the ratio of the NCO groups of the polyisocyanate component containing two differently reactive NCO groups to the OH groups of the polyol component i) being between 1.05 and 2.0 and preferably between 1.1 and 1.7 and the ratio by weight formed from the quantity of polyol component i) used plus the quantity of the polyisocyanate component containing two differently reactive NCO groups and the quantity of the crystalline polyol component ii) used plus the quantity of the diisocyanate component containing isocyanate groups which are more reactive to OH groups than the less reactive NCO groups of the isocyanate containing two differently reactive NCO groups being between 10 and 0.1 and preferably between 4 and 1.

DETAILED DESCRIPTION OF THE INVENTION

The polyfunctional polyol components, liquid or highly viscous (paste-like) at room temperature (25° C.), which may be used in accordance with the invention are preferably mixtures of at least one OH-functional polyether polyol. The polyether polyols may have molecular weights in the range from 100 to 5,000 and preferably in the range from 100 to 2,000, the optionally resulting mixtures may have average molecular weigths in the range from 500 to 5.000. preferably in the range from 500 to 2,000. These polyether polyols may be obtained by the ring-opening polymerization of propylene oxide and ethylene oxide in the presence of one or more low molecular weight compounds containing active hydrogen or by the ring-opening polymerization of tetrahydrofuran. The polyether polyols obtained from propylene oxide and diols, such as for example ethylene glycol, propylene glycol, butane-1,4-diol, pentane-1,5-diol, hexane-1,6-diol or neopentyl glycol, which may be used in accordance with the invention are particularly preferred.

Polyfunctional polyol components, liquid or highly viscous (paste-like) at room temperature (25° C.), which may optionally be used in accordance with the invention, are OH-functional polyester polyols having a molecular weight of 500 to 5,000, preferably 1,000 to 5,000 and, more preferably, 2,000 to 5,000. Preferred liquid or highly viscous (paste-like) polyesters which may be used in accordance with the invention are those which may be obtained by condensation from a low molecular weight aliphatic dicarboxylic acid, for example adipic acid, and a mixture of the above-mentioned diols in excess, preferably a mixture containing neopentyl glycol.

Polyfunctional polyol components, crystalline at room temperature (25° C.), which may be used in accordance with the invention are OH-functional polyester polyols having a molecular weight in the range from 500 to 10,000 and preferably in the range from 2,000 to 5,000. They may be obtained by condensation from a low molecular weight aliphatic dicarboxylic acid and one of the above-mentioned diols in excess or by polymerization of lactones. Crystalline polyesters preferably used in accordance with the invention are those obtained by condensation from adipic acid and one of the above-mentioned diols in excess, more preferably butane-1,4-diol or hexane-1,6-diol.

This invention is unlike that which is described in DE-A 4 023 801 which claims a moisture-curing hotmelt adhesive partly containing a thermoplastic saturated polyester polyol having a glass transition temperature of at least 10° C. A glass-like ester of this type is not a characteristic part of the present invention. The segmented prepolymers containing glass-like segments used in the above-cited application have high viscosities which cause difficulties during application and adversely affect the wetting of the substrates. Relatively high % NCO values are required for establishing lower viscosities, resulting in reduced resistance to foaming during the final curing phase.

In a particularly preferred embodiment of this invention, the polyisocyanate component containing two differently reactive NCO groups is aromatic 2,4-tolylene diisocyanate. However, asymmetrically substituted derivatives of diphenylmethane diisocyanate and also aliphatic isophorone diisocyanate are also suitable.

As to the useful diisocyanates of which the isocyanate groups are more reactive to OH groups than the less reactive NCO groups of the useful polyisocyanate containing two differently reacting NCO groups, in accordance with the invention, aromatic 4,4'-diphenylmethane diisocyanate is particularly suitable, whereas aliphatic 4,4'-dicyclohexyl methane diisocyanate or hexamethylene diisocyanate is less suitable.

The reaction of the polyol components with the polyisocyanate components is preferably carried out by reacting the polyfunctional polyol component, liquid or highly viscous (paste-like) at room temperature (25° C.), with the polyisocyanate component containing two differently reactive NCO groups, the NCO:OH ratio being between 1.05 and 2.0 and preferably between 1.1 and 1.7, and the polyfunctional polyol component, crystalline at room temperature, with the diisocyanate component containing isocyanate groups which are more reactive to OH groups than the less reactive NCO groups of the isocyanate containing two differently reactive NCO groups and mixing the two reaction products. The overall ratio of NCO:OH groups is greater than 1, preferably between 2 and 1 and, more preferably, between 1.8 and 1.2. Alternately, the reaction of the polyol component with the polyisocyanate components is preferably carried out by reacting the polyfunctional polyol component, liquid or highly viscous (paste-like) at room temperature (25° C.), with a polyisocyanate component containing two differently reactive NCO groups to a constant % NCO value and optionally in accordance with U.S. application Ser. No. 07/722,715 filed Jun. 27, 1991, now U.S. Pat. No. 5,143,995 - with small quantities of water and then with a diisocyanate component having an NCO reactivity to hydroxyl groups which is greater than that of the less reactive NCO groups of the polyisocyanate component containing two differently reactive NCO groups and reacting the mixture with the polyfunctional polyol component, crystalline at room temperature (25° C.). The overall ratio of NCO:OH groups being greater than 1, preferably between 2 and 1 and, more preferably, between 1.8 and 1.2 and the ratio of the NCO groups of the polyisocyanate component containing two differently reactive NCO groups to the OH groups of the polyol component a) being between 1.05 and 2.0 and preferably between 1.1 and 1.7.

In the hotmelt adhesive composition according to the invention, the ratio by weight between the total quantity of liquid or highly viscous (paste-like) polyol component to be used in accordance with the invention and the isocyanate component containing two differently reactive NCO groups, on the one hand, and the crystalline polyol component to be used in accordance with the invention and the diisocyanate component containing isocyanate groups which are more reactive to OH groups than the less reactive NCO groups of the isocyanate containing two differently reactive NCO groups, on the other hand, may be varied in accordance with the desired requirement profile and may be between 10 and 0.1. A ratio by weight between 4 and 1 is preferred.

The adhesive composition according to the invention is characterized in that it contains a polyurethane prepolymer obtained by one of the reactions described above. In addition, other suitable components, such as primers, curing catalysts, fillers, thixotropic agents and pigments, may be selectively used in suitable quantities.

Thus, it has proved to be particularly advantageous to react a small proportion of the NCO groups of the adhesive composition according to the invention with an additive from the group of NCO-reactive hydroxyfunctional or aminofunctional silanes as a primer for glass surfaces. Preferred products of this purpose are, for example, γ-aminopropyl trimethoxysilane or γ-aminopropyl triethoxysilane which may be used in quantities of up to 2% by weight.

The particular embodiment of the hotmelt adhesive composition according to the invention which is formed by the above-mentioned addition of NCO-reactive silanes are distinguished by their resistance to moisture and water in regard to the imperviousness of the adhesive joint and adhesion. This had not been expected from the use of a basically hydrolysis-sensitive polyester component in a hotmelt adhesive composition.

In addition, it has been found that, after application to non-preheated glass, a composition which does not correspond to the invention, i.e. from which the liquid or highly viscous (paste-like) polyol component to be used in accordance with the invention is missing, i.e. using only a crystalline polyol component, leads to adhesive "beads" which adhere poorly through spontaneous crystallization and "skin formation", separating spontaneously from the substrate through a change in volume. By contrast, the adhesive composition according to the invention is distinguished by the fact that, even when applied to non-preheated glass surfaces, it gives firmly adhering adhesive beads, the adhesive still sets sufficiently quickly and, after application, has a flexibility which promotes adhesion to the substrate.

In addition, it can be of advantage to add a suitable curing catalyst, for example dibutyl tin dilaurate, in small quantities (up to 2%) to achieve short final curing times.

Suitable fillers are isocyanate-inert inorganic compounds, for example chalk or lime powder, precipitated and/or pyrogenic silicas, zeolites, bentonites, ground minerals, for example talcums, and other inorganic fillers known to the expert. However, organic fillers, for example chopped strands or the like, may also be used. For special applications requiring a stable adhesive bead with good non-sag behavior, it is preferred to use thixotropic fillers, such as pyrogenic silica gels.

This and other aspects of the invention are further illustrated by the following non-limiting examples.

EXAMPLES

Example 1

155.4 Parts by weight polypropylene glycol (OH value 112) were mixed with 44.7 parts by weight 2,4-tolylene diisocyanate in a reaction vessel equipped with a stirrer. The reaction mixture was heated at 80° C. and was left standing at that temperature to a constant NCO value (theoretical 4.2% NCO). The prepolymer formed had a viscosity of 60,000 mPa.s at 25° C. and 5,000 mPa.s at 50° C. In a second reaction vessel, 176.4 parts by weight of an aliphatic crystalline polyester, derived from adipic acid and hexane diol and having OH value of 28, were reacted with 23.4 parts by weight 4,4'-diphenylmethane diisocyanate at 80° C. to a constant NCO value (theoretical 2.1 % NCO). The prepolymer formed had a viscosity at 100° C. of 21,000 mPa.s. The two prepolymers were mixed in a ratio by weight of 1:0.5. 2.5 Parts γ-aminopropyl trimethoxysilane (Dynasilan ® AMMO from Hüls AG, Rheinfelden, Germany) were initially added to the mixture, followed by 0.25 part dibutyl tin dilaurate and finally, 15.0 parts hydrophobicized pyrogenic silica (Aerosil ® R 202 from Degussa AG, Frankfurt/Main, Germany).

The highly viscous mixture formed was applied at 80° C. to preheated (80° C.) and cold (RT) glass plates in a layer thickness of 3 mm. Depending on the temperature of the substrate, crystallization to form a tack-free surface occurred over a period of 4 mins. (RT) or 10 mins. (80° C.). The adhesive applied was stored in air for 7 days at RT and then subjected to long-term storage in deionized water heated to 60° C. Irrespective of the temperature of the glass plates during application, the adhesive could only be removed from the glass with cohesive fracture, even after 14 days.

Example 2

155.4 Parts by weight polypropylene glycol (OH value 112) were mixed with 44.7 parts by weight 2,4-tolylene diisocyanate in a reaction vessel equipped with a stirrer. The reaction mixture was heated at 80° C. and was left standing at that temperature to a constant NCO value (theoretical 4.2% NCO). The prepolymer formed had a viscosity of 60,000 mPa.s at 25° C. and 5,000 mPa.s at 50° C. In a second reaction vessel, 176.4 parts by weight of an aliphatic crystalline adipic acid polyester, OH value 28 (as described in Example 1), were reacted with 23.4 parts by weight 4,4'-diphenylmethane diisocyanate at 80° C. to a constant NCO value (theoretical 2.1% NCO). The prepolymer formed had a viscosity at 100° C. of 21,000 mPa.s. The two prepolymers were mixed in a ratio by weight of 1:0.4. 2.3 Parts -aminopropyl trimethoxysilane (Dynasilan ® AMMO) were initially added to the mixture, followed by 0.25 part dibutyl tin dilaurate and, finally, 8.4 parts pyrogenic silica (Aerosil ® R 202)

The highly viscous mixture formed was applied at 80° C. to preheated (80° C.) and cold (RT) glass plates in a layer thickness of 3 mm. Depending on the temperature of the substrate, crystallization to form a tack-free surface occurred over a period of 4 mins. (RT) or 10 mins. (80° C.). The adhesive applied was stored in air for 7 days at RT and then subjected to long-term storage in deionized water heated to 60° C. Irrespective of the temperature of the glass plates during application, the adhesive could only be removed from the glass with cohesive fracture, even after 14 days.

Example 3 (Comparison)

In a stirred reaction vessel, 400 parts by weight of a crystalline adipic acid hexanediol polyester, OH value 28 (as in example 1) were reacted at 80° C. first with 27.7 parts by weight 2,4-tolylene diisocyanate and then with 41.9 parts by weight 4,4'-diphenylmethane diisocyanate until the NCO value was constant (3.7% NCO). First 4.70 parts by weight -aminopropyl trimethoxysilane (Dynasilan ® AMMO), then 0.47 part by weight dibutyl tin dilaurate and, finally, 23.5 parts by weight pyrogenic silica (Aerosil ® R 202) were added to the highly viscous prepolymer formed. The highly viscous mixture formed was processed as in Example 1. The adhesive layer applied to cold glass separated spontaneously from the substrate after crystallization (approx. 3 mins.). When the other sample was stored in deionized water heated to 60° C., adhesion was lost after 48 hours.

Example 4 (Comparison)

In a stirred reaction vessel, 257.2 parts by weight polypropylene glycol (OH value 112) were mixed with 252.0 parts by weight 4,4'-diphenylmethane diisocyanate. The reaction mixture was heated to 80° C. and left at that temperature to a constant NCO value. 430.8 Parts by weight of an aliphatic crystalline adipic acid polyester (as described in Example 1), OH value 28, were then added and the mixture was stirred until the NCO value was constant. First, 9 parts by weight Dynasilan ® AMMO, then 1 part by weight dibutyl tin dilaurate and, finally, 45 parts by weight Aerosil ® R 202 were added to the highly viscous prepolymer formed. The highly viscous mixture formed was processed as in Example 1. The adhesive layer applied to cold glass separated spontaneously from the substrate after crystallization (approx. 4 mins.). When the other sample was stored in deionized water heated to 60° C., adhesion was lost after 48 hours.

What is claimed is:

1. A process for bonding substrates in the presence of moisture with a moisture-curing, NCO-reactive polyurethane hotmelt adhesive composition, comprising applying the adhesive composition to a surface of one of the substrates and contacting it with a surface of another substrate to which is optionally applied the adhesive composition which is a reaction product of:

A) a mixture of:
   i) polyfunctional polyol component which is liquid or highly viscous (paste-like) at room temperature (25° C.) and which has a molecular weight of 500 to 5,000 and
   ii) a polyfunctional polyol component which is crystalline at room temperature (25° C.) and which has a molecular weight of 500 to 10,000 and with B)
   (i) a mixture of a polyisocyanate component containing two differently reactive NCO groups and
   (ii) a diisocyanate component having an NCO functionality to hydroxyl groups which is greater than that of the less reactive NCO groups of the polyisocyanate component containing two differently reactive NCO groups, the overall ratio of NCO:OH groups being greater than 1, and the ratio of the NCO groups of the polyisocyanate component containing two differently reactive NCO groups to the OH groups of the polyol component being between 1.25 and 2.5, and the ratio by weight formed from the quantity of polyol component i) plus the quantity of the polyisocyanate component containing two differently reactive NCO groups and the quantity of the crystalline polyol component ii) plus the quantity of diisocyanate component containing isocyanate groups which are more reactive to OH groups than the less reactive NCO groups of the isocyanate containing two differently reactive NCO groups being between 10 and 0.1.

2. The process of claim 1 which is characterized in that the polyisocyanate component containing two differently reactive NCO groups is tolylene-2,4-diisocyanate and the diisocyanate component containing isocyanate groups which are more reactive to OH groups than the less reactive NCO groups of the polyisocyanate containing two differently reactive NCO groups is 4,4'-diphenylmethane diisocyanate.

3. A process of claim 1 characterized in that a NCO-reactive silane additive is reacted with free NCO groups in a quantity of up to 2% by weight.

4. A process of claim 1 characterized in that the NCO-reactive polyurethane hotmelt adhesive composition contains an additive selected from the group consisting of pigments, fillers, UV stabilizers, curing catalysts and accelerators, comprising applying the adhesive composition to a surface of one of the substrates and contacting it with a surface of another substrate to which is optionally applied the adhesive composition.

5. The process of claim 1 wherein the substrates are selected from the group consisting of glass and glass/plastic composites.

6. The process of claim 4 wherein the substrates are selected from the group consisting of glass and glass/plastic composites.

* * * * *